United States Patent [19]

Matthews

[11] 4,388,807

[45] Jun. 21, 1983

[54] GEOTHERMAL POWER EXTRACTION SYSTEM WITH ABOVE SURFACE HEATING OF WORKING FLUID

[75] Inventor: Hugh B. Matthews, Boylston, Mass.

[73] Assignee: Sperry Corporation, New York, N.Y.

[21] Appl. No.: 247,436

[22] Filed: Mar. 25, 1981

[51] Int. Cl.³ .............................................. F03G 7/00
[52] U.S. Cl. ..................................... 60/641.4; 60/677
[58] Field of Search ...................... 60/641.4, 670, 677, 60/676

[56] References Cited

U.S. PATENT DOCUMENTS 3,972,196  8/1976  Silvestri, Jr. ........................... 60/670
4,077,220  3/1978  Matthews ............................ 60/641.4

Primary Examiner—A. Michael Chambers
Attorney, Agent, or Firm—Howard P. Terry

[57] ABSTRACT

In a geothermal energy conversion system of the type having a down-hole turbine pump unit driven by a heated working fluid, a heat exchanger is disposed at the surface of the earth for heating the working fluid. The turbine pump unit pumps the geothermal brine to surface heat exchanger where it is used to heat the working fluid. The same heated working fluid is used to drive the down-hole turbine pump and to drive the power generating equipment at the earth's surface.

5 Claims, 3 Drawing Figures

GEOTHERMAL POWER EXTRACTION SYSTEM WITH ABOVE SURFACE HEATING OF WORKING FLUID

BACKGROUND OF THE INVENTION

1. Field of the Invention

The invention relates generally to efficient means for the generation of electrical power by utilizing energy from subterranean geothermal sources and, more particularly, relates to novel arrangements for application in deep, hot water wells for the beneficial extraction of thermal energy at the earth's surface.

2. Description of the Prior Art

Generally related geothermal power generation systems have been particularly discussed in several U.S. patents assigned to Sperry Corporation including:

H. B. Matthews—U.S. Pat. No. 3,824,793 for "Geothermal Energy System and Method" issued July 23, 1974;

H. B. Matthews—U.S. Pat. No. 3,989,020 for "Geothermal Energy System and Method", issued Aug. 5, 1975;

R. Govindarajan, J. L. Lobach, K. E. Nichols—U.S. Pat. No. 3,905,196 for "Geothermal Energy Pump Thrust Balance Apparatus", issued Sept. 16, 1975;

J. L. Lobach—U.S. Pat. No. 3,908,380 for "Geothermal Energy Turbine and Well System", issued Sept. 30, 1975;

H. B. Matthews—U.S. Pat. No. 3,910,050 for "Geothermal Energy System and Control Apparatus", issued Oct. 7, 1975;

H. B. Matthews—U.S. Pat. No. 3,938,334 for "Geothermal Energy Control System and Method", issued Feb. 17, 1976;

H. B. Matthews—U.S. Pat. No. 3,939,659 for "Geothermal Energy System Fluid Filter and Control Apparatus", issued Feb. 24, 1976; and K. E. Nichols—U.S. Pat. No. 3,961,866 for "Geothermal Energy System Heat Exchanger and Control Apparatus" issued June 8, 1976.

Systems of the foregoing patents may be improved by use of the invention as will be further discussed in the present specification; in general, the prior systems comprise geothermal energy recovery systems making use of thermal energy stored by subterranean heat sources in hot, solute-bearing well water to generate superheated working vapor from a surface-injected flow of a clean working liquid; the super-heated vapor is then used to operate a turbine-driven pump within the well for pumping the hot brine at high pressure and always in liquid state to the earth's surface, where it transfers its heat in a binary, closed-loop, heat-exchanger turbine-alternator combination for generation of electrical power. Residual brine is pumped back into the earth, while the clean, cooled working liquid is regenerated at the surface-located system and is returned continuously to the deep well pumping system for generating working vapor.

SUMMARY OF THE INVENTION

The present invention is an improved geothermal energy extraction system that recovers thermal energy stored in hot solute-bearing well water to generate a superheated fluid from a flow of working fluid. The superheated fluid is used to drive a turbine-driven pump near the geothermal well bottom for pumping hot brine, always in liquid state, toward the earth's surface. In the present invention, the same superheated working fluid that drives the down-well turbine motor also drives the surface-located power turbine and electrical generator. Thus, the surface-generated working fluid vapor serves two vital functions, being generated by the primary surface heat exchanger from the thermal energy stored in the rising brine solution. The main portion of the working vapor drives the main or surface electrical power generating turbine motor and generator, with the remainder being routed down into the geothermal well to drive the brine pump turbine motor. This remainder is then returned as exhaust vapor to the earth's surface to be condensed or inserted into an intermediate stage of the surface power turbine. The invention advantageously converts a significantly higher portion of the available geothermal energy into useful electrical output power.

DESCRIPTION OF THE PREFERRED EMBODIMENTS

Figure 1:
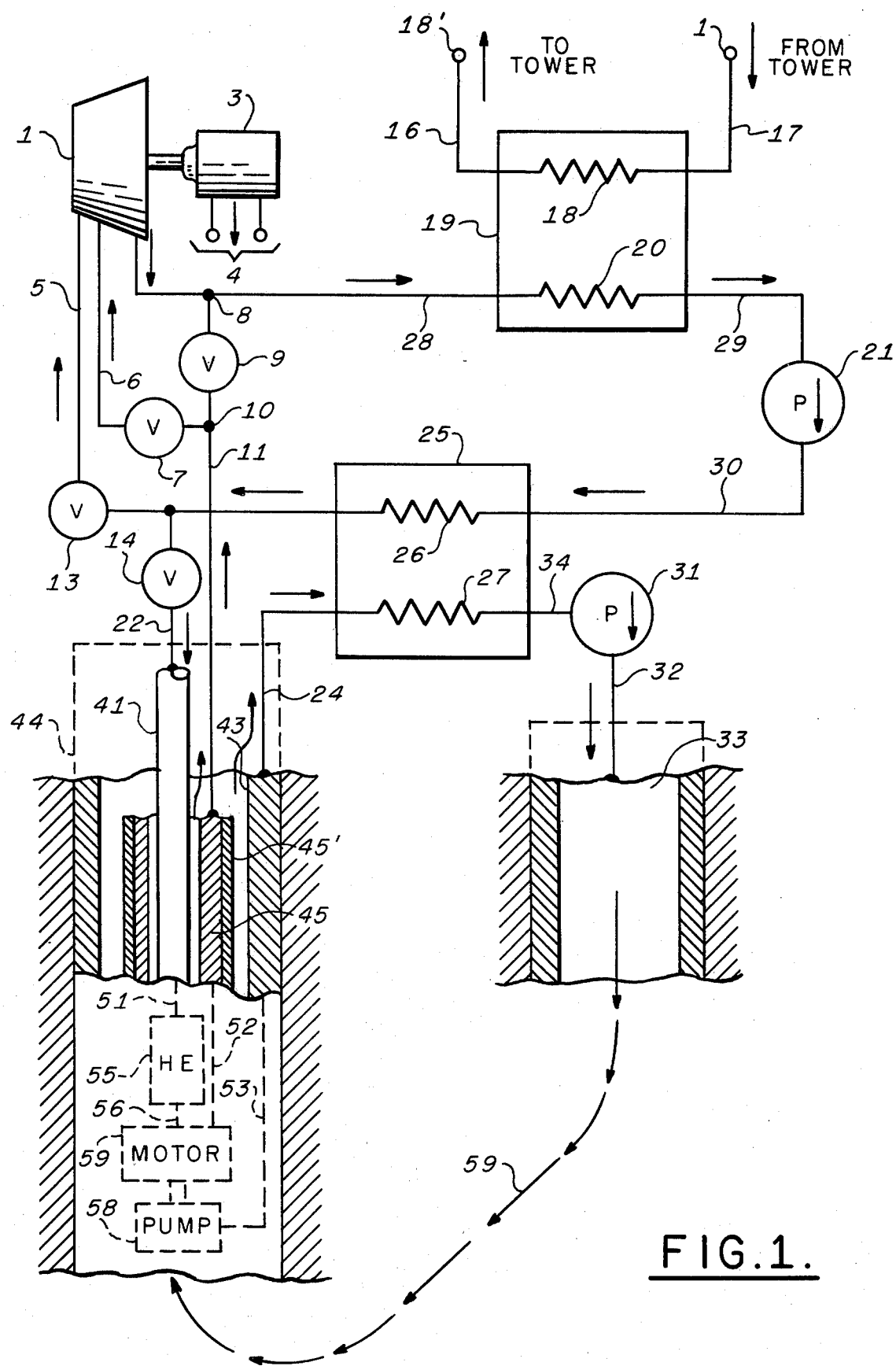
FIG. 1 is an elevation view, partly in cross-section, of the deep well geothermal energy conversion system and of cooperating surface-located control and power generation apparatus.

FIG. 1 illustrates one embodiment of the novel geothermal energy extraction system as being composed of three major subsystems. The first or geothermal well subsystem extends from its well head 44 located adjacent the earth's surface for a distance far below that surface into an effective cavity or region where a copious supply of extremely hot water or brine under high pressure is naturally available. An active turbine motor 57 and a brine pump 58 are located adjacent the hot water reservoir within a conventional well casing 43 for operation in the manner generally described in the aforementioned Matthews U.S. Pat. Nos. 3,824,793 and 3,910,050 and elsewhere. In such prior art systems, a working fluid such as a halocarbon fluid is turned to vapor deep within the well in a vapor generator or heat exchanger, such as in heat exchanger 55, heated by the flow of hot brine past it within well casing 43. Moreover, in the prior art, the turbine-motor exhaust flows from turbine motor 57 via conduit 52 to the earth's surface; there, it is condensed and is returned in liquid form, as by conduits 22, 41, 51, to vapor generator 55. It should be noted that the apparatus of the present invention for all practical purposes makes the vapor generator or heat exchanger 55 redundant, since the working fluid may be fully heated in the heat exchanger 25 as hereinafter described.

A second subsystem of the present invention in the form of a brine reinjection well 33 also extends from a location at the earth's surface into deep earth strata, which reinjection well may be horizontally spaced from the aforementioned hot brine source. Apparatus at the earth's surface forms a third subsystem and cooperates with the geothermal and reinjection well system according to the present invention, as is illustrated in FIG. 1. It will be understood that an objective of the invention is to generate large quantities of electrical power at terminals 4 at the earth's surface using a conventional fluid turbine 1 driving an electrical power generator 3, both preferably located at ground level. For this purpose, hot brine is pumped to the earth's surface by the geothermal well pump 58 in conduit 53, and the conduit extension 24 to element 27 of a surface heat exchanger device 25. Apparatus 25 is a conventional closed tank-like device designed to exchange heat between conventional heat exchanger 26 and 27 located therein. Elements 26 and 27 may take the forms of lineal or coiled pipes exchanging thermal energy by direct thermal conduction through their metal walls or through a suitable fluid. The well pump 58 forces the hot brine upward through the conduit 53 and then through conduit 24. The hot brine from conduit 24 is a significant source of heat for supply to the input element 27 of device 25. As in the aforementioned Matthews patent, the brine passing through element 27 also passes through conduit 34 after having been dropped in temperature within heat exchanger 25 and is fed through pump 31, if needed, and conduit 32 into reinjection well 33. Thus, the dissolved mineral salts pumped to the surface in the hot brine are returned harmlessly into the ground at reinjection well 33.

According to the present invention, the prior art is beneficially altered to effect the conversion of a higher portion of the available energy present in the geothermal brine into useful output energy at generator terminals 4. As noted in connection with FIG. 1, thermal energy present in the brine flowing upward in conduit 24 is fed through the input heat exchanger element 27 of heat exchanger 25, whereupon the cooled brine is fed through conduit 34, pump 31, and conduit 32 into the reinjection well 33. The residual brine and residual heat stored in it are thus recirculated as indicated generally by path 59, and the brine is reheated in the subterranean geothermal zone for further recycling by down-well pump 58.

A second heat exchanger element 26 in the conventional heat exchanger 25 is coupled through junction 12, valve 13, and conduit 5 to the high pressure vapor input of turbine 1. A portion of the vapor flow passes through junction 12, valve 14, and conduits 22, 41 and 51 through the down-well heat exchanger 55, if it is used. Energetic working vapor is, in any event, supplied via conduits 51 and 56 to drive the turbine-motor 57 and down-well brine pump 58.

Returning now to the above surface loop, exhaust vapor from power turbine 1 is fed through junction 8 and conduit 28 to the input heat exchanger element 20 of a conventional condenser 19. Within condenser element 20, the flow of spent vapor is condensed by the conventional action of coolant flowing through a second exchanger element 18 through the cooperation of a conventional cooling tower, not shown but connected at terminals 18', 18" of the respective conduits 16, 17. Condensed working fluid is pumped through conduit 29 by pump 21 and thence through conduit 30 to the input element 26 of the primary heat exchanger element 26 of exchanger 25.

The apparatus of FIG. 1 represents apparatus which may be operated selectively in either one of two modes. In a first mode of operation, valve 9 is closed and all other valves are open. Operation is as previously discussed, with the further advantage that energy contained in the exhaust from down-well turbine motor 57 and returned to the surface via conduits 52 and 11 flows through junction 10, valve 7, and conduit 6 to be usefully injected into an intermediate pressure stage of turbine 1.

In the second mode of operation, valve 7 is closed, while the remainder of the valves, including valve 9, are opened. In this mode, the exhaust from down-well turbine motor 57 returned to the surface through conduits 52 and 11 passes through junction 10 and valve 9, is mixed at junction 8 with the exhaust of turbine 1, and is thus supplied by conduit 28 to the cooling heat exchanger 19 for recirculation. The second mode of operation requires that the conduit 45 for returning exhaust vapor from the down-well turbine motor 57 to the earth's surface be made of a thermal insulating material, or that the same desired effect be achieved by applying a layer of thermal insulator material 45' by conventional means to one of its surfaces, thus desirably diminishing heat flow from the hot brine within well casing 43 into the exhaust vapor flowing upward in conduit 45. Conduit 45 may be partially or totally constructed of conventional molded refractory materials cast with a suitable binder and may contain glass, asbestos or similar fibers.

In prior art down-well pumping systems, the turbine motor exhaust normally returns to the earth's surface separated from the rising hot brine only by the steel walls of its conduit, thus undesirably abstracting heat from the brine. The temperature of the turbine exhaust thus rises above its already superheated condition, all of which superheat must be dissipated uselessly at the earth's surface before condensation of the working fluid can take place. Additionally, according to the present invention, surface equipment is simplified and total initial cost reduced.

In addition to the foregoing advantages, it is seen that the invention considerably reduces the complexity and therefore the cost of the prior art apparatus as typically represented by the aforementioned Matthews U.S. Pat. No. 3,824,793. The down-well heat exchanger 55 used in the prior art may be totally, or at least largely, removed, simplifying the down-well arrangement. The down-well pressure regulator is also removed. The surface-located driving loop of the prior patent, including a condenser and pump, are also eliminated.

Figure 2:
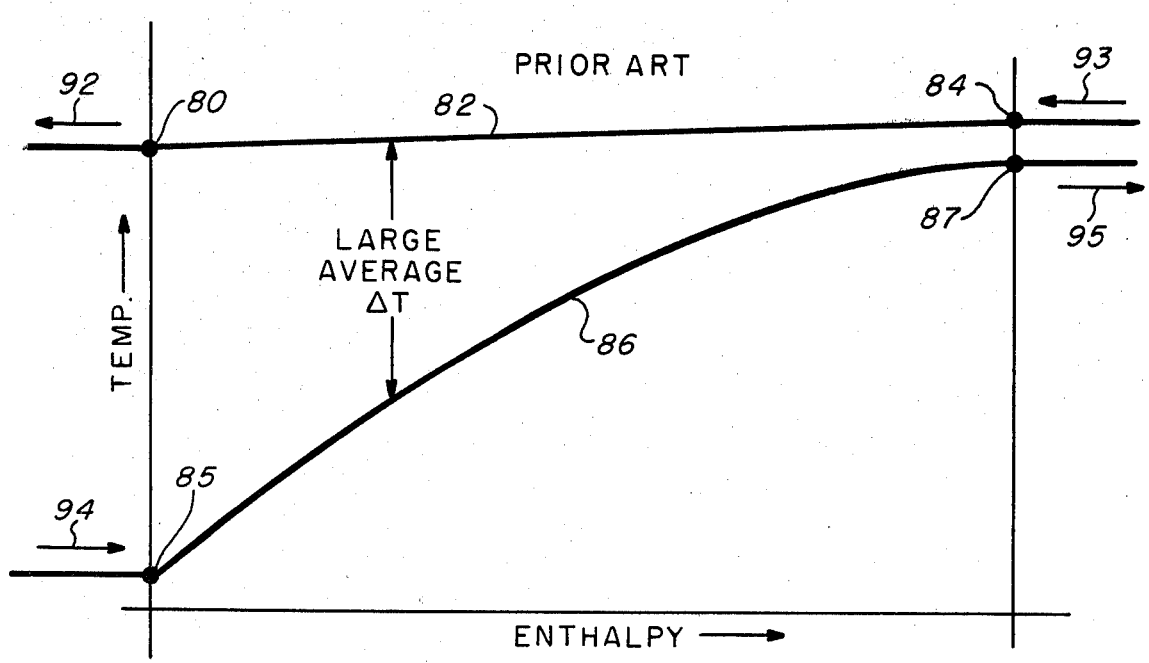
FIGS. 2 and 3 are graphs useful in explaining the operation of the invention.
Figure 3:
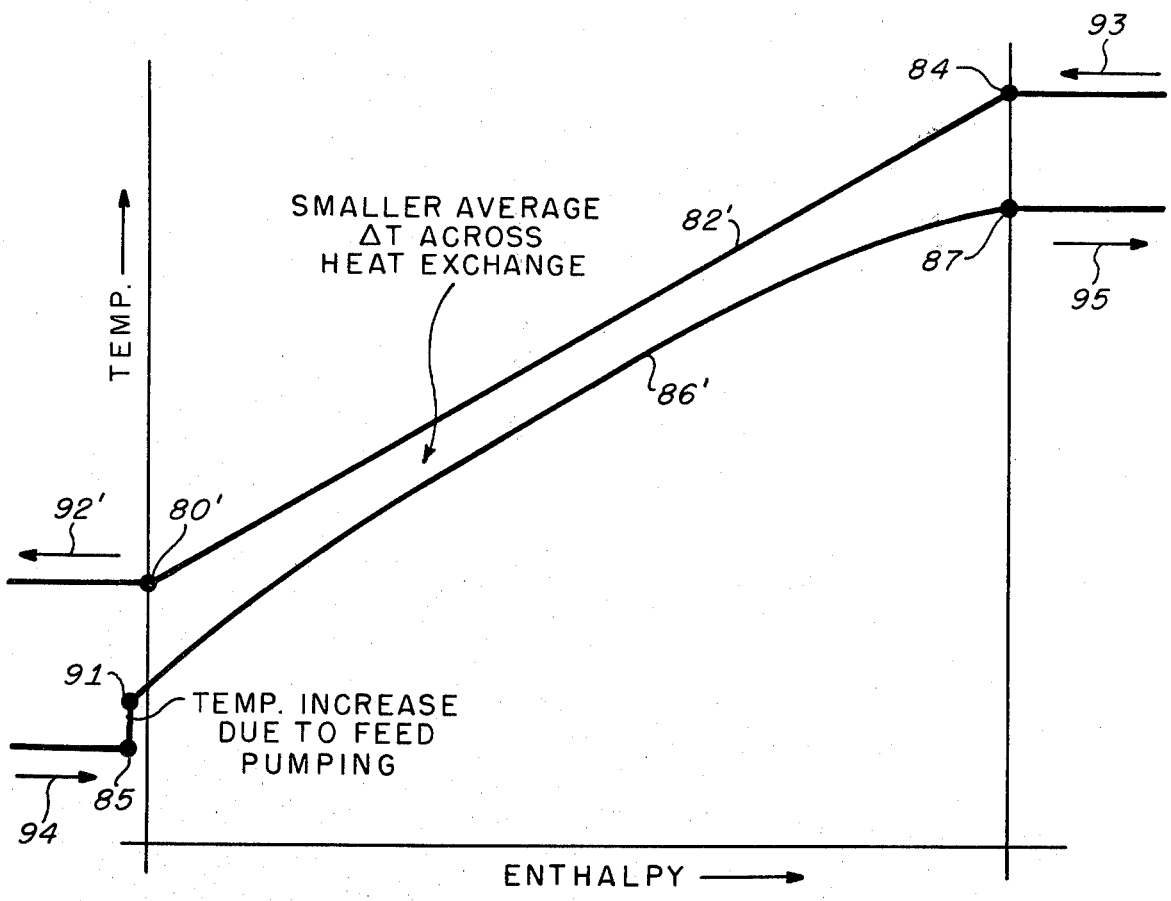

The improved operation as illustrated in FIG. 3 of the novel system may be contrasted with the operation as illustrated in FIG. 2 of the prior art system; temperature versus enthalpy curves are shown for the two instances. In the prior art system of FIG. 2, the entry of the hot brine into the system is indicated by arrow 93; this occurs at the input of the hot brine into heat exchanger 55 and is characterized by the t-h (temperature-enthalpy) value at point 84. The temperature during the upward flow of the hot brine is indicated by the small slope of line 82 which is caused by enthalpy usefully extracted to drive the down-hole turbine, and the brine reaches the t-h condition 80 upon its arrival at the earth's surface. The temperature level at point 84 may, for example, be 350° F. while that at point 80 is 340° F.

Curve 86 generally represents the situation for the working fluid in the prior art geothermal pump system, flowing into the well head 44 as indicated by arrow 94 in the t-h condition represented by point 85. Curve 86, which is typically non-linear for the conventional binary type of geothermal system, reaches the t-h condition 87 at the exit situation or output of heat exchanger 55 represented by arrow 95. The condensed organic working fluid, coming into the system at a low temperature at point 85, such as at 100° F., rapidly increases in temperature to the t-h condition 87. This rapid increase in temperature typically occurs at the bottom of the down-well heat exchanger 55 at the entry into the turbine-motor 57 where the working fluid reaches a high temperature, for example 330° F. Transferring thermal energy from the hot brine to the organic fluid at such a large average temperature across the heat exchanger results in a loss of available energy.

FIG. 3 represents the advantages of modifying the prior art according to the present invention. Operation of feed pump 21 and heat exchanger 25 increases the pressure and the temperature of the working fluid at the well head 44 as represented by points 85 and 91 of FIG. 3. The difference between curves 86' and 82' is altered as a result of the increase in temperature and pressure such that they become much more nearly parallel, greatly increasing the efficiency of heat exchange for the system. It can be appreciated from FIG. 2 and FIG. 3 that while there is substantially the same amount of work performed in pumping hot brine, there is substantially different heat transfer between the hot brine and the organic working fluid. For example, it is readily apparent that the average temperature difference $\Delta T$ between curves 82 and 86 of FIG. 2 is considerably greater than the temperature difference between curves 82' and 86' of FIG. 3. In the apparatus of the present invention, therefore, the heating of the working fluid at the surface and conducting it downwell eliminates the inefficiency of the prior art system, since there are no large amounts of wasted work associated with the transfer of thermal energy across the heat exchanger.

Thus, it can be appreciated that the surface-generated working vapor performs a dual role, the greater portion of working fluid drives the primary electrical power generator while the remainder is conducted down into the geothermal well to drive the brine pump turbine motor. This remainder may be returned to the earth's surface to be condensed or to be inserted into an intermediate stage of the surface power turbine. It is seen that the invention advantageously converts an increased part of the available geothermal energy into useful electrical power.

While the invention has been described in its preferred embodiments, it is to be understood that the words which have been used are words of description rather than of limitation and that changes may be made within the purview of the appended claims without departing from the true scope and spirit of the invention in its broader aspects.

I claim:

1. Geothermal deep well energy extraction apparatus of the kind in which solute-bearing water is pumped to a first station at the earth's surface from a subterranean second station by utilizing thermal energy extracted from said solute-bearing water for operating turbine-motor driven electrical generator means at said first station, said solute-bearing water being returned directly from said first station into reinjection well means, said extraction means including:

vapor generator means at said first station utilizing a first portion of said thermal energy for supplying a working fluid for driving subterranean pump means for pumping said solute-bearing water from said second to said first station, said vapor generator means being heated by said solute-bearing water before return to said reinjection well, means for additionally supplying said working fluid for driving said turbine-motor driven electrical generator means by utilizing a second portion of said thermal energy, means for condensing said working fluid exhaust vapor from the turbine motor of said turbine-motor driven electrical generator means, and pump means for pumping said condensed working fluid exhaust in heat exchanging relation through said vapor generator means for parallel supply for driving said subterranean pump means and said turbine-motor driven electrical generator means.

2. Apparatus as described in claim 1 wherein:
   said turbine motor of said turbine-motor driven electrical generator means has at least two input stages, comprising:
   a first input stage supplied directly with said working fluid from said vapor generator means, and
   a second input stage supplied with the exhaust vapor of said subterranean pump means.

3. Apparatus as described in claim 1 wherein said working fluid vapor from the turbine motor of said turbine-motor driven electrical generator means is combined with the exhaust vapor of said subterranean pump means prior to condensing by said means for condensing.

4. Apparatus as described in claim 3 including thermally insulating conduit means extending from said subterranean pump means to said first station for minimizing heat transfer from said solute-bearing water into said exhaust vapor from said subterranean pump means.

5. Apparatus as described in claim 2 wherein the operating pressure level of said first input stage is greater than that of said second stage.

* * * * *